No. 663,494. Patented Dec. 11, 1900.
G. W. HARRIS.
FENDER ATTACHMENT FOR CULTIVATOR PLOWS.
(Application filed Sept. 4, 1900.)
(No Model.)
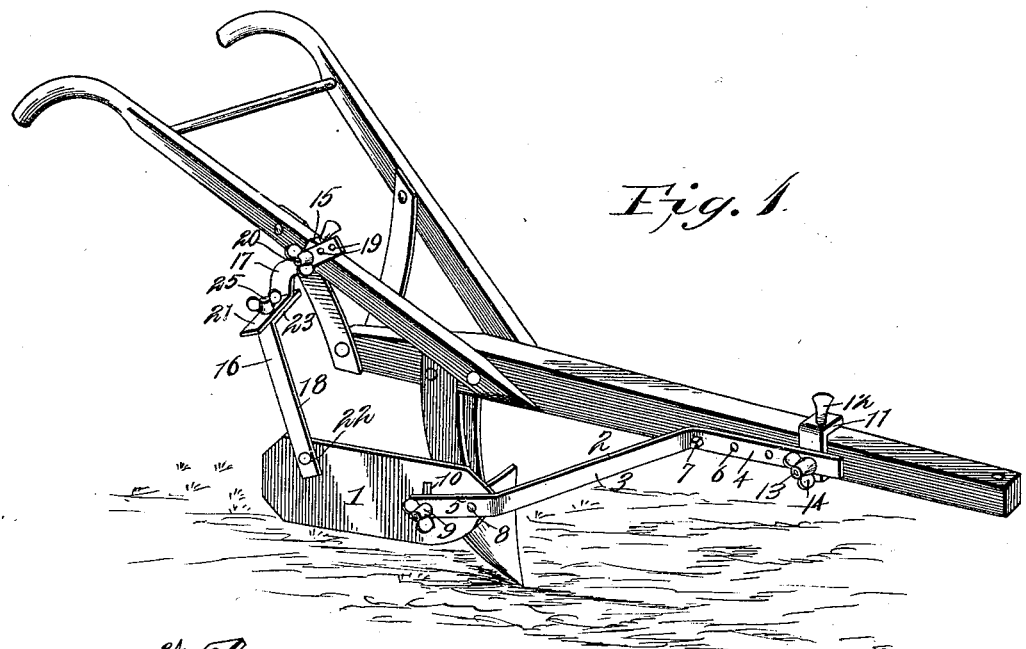
Witnesses
G. W. Harris, Inventor
By
Attorneys

UNITED STATES PATENT OFFICE.

GEORGE WILEY HARRIS, OF MAHARRIS, MISSISSIPPI.

FENDER ATTACHMENT FOR CULTIVATOR-PLOWS.

SPECIFICATION forming part of Letters Patent No. 663,494, dated December 11, 1900.

Application filed September 4, 1900. Serial No. 28,948. (No model.)

*To all whom it may concern:*

Be it known that I, GEORGE WILEY HARRIS, a citizen of the United States, residing at Maharris, in the county of Copiah and State of Mississippi, have invented a new and useful Fender Attachment for Cultivator-Plows, of which the following is a specification.

My invention relates to an improvement in fender attachments for cultivating-plows, the object of my invention being to provide a fender which may be attached to and used in connection with any ordinary form of cultivating-plow and which fender may be adjusted to any required position on the plow.

My invention consists in the peculiar construction and combination of devices hereinafter fully set forth, and pointed out in the claim.

In the accompanying drawings, Figure 1 is a perspective view of a cultivator-plow provided with my improved fender attachment. Fig. 2 is a detail perspective view of the fender. Fig. 3 is a detail perspective view of one of the clips. Fig. 4 is a detail top plan view.

My improved fender 1 may be either of the form here shown or of any other suitable form and is provided with a front attaching brace-bar 2, which has the obliquely-disposed intermediate portion 3, the forward-extending arm 4, and the rearward-extending arm 5. The said forward-extending arm 4 has a series of adjusting-openings 6, and in the said arm, near the rear end thereof, is an adjusting-screw 7. The rear arm 5 bears against the outer side of the front portion of the fender and is pivoted thereto, as at 8, and the said arm 5 has at its rear end a clamping bolt or screw 9, which operates in an adjusting-slot 10, with which the fender is provided, the said adjusting-slot being concentric with the pivot 8. A clip 11 is secured on the beam of the plow, at a suitable distance from the front end thereof, by a set-screw or bolt 12, which operates in an opening in the upper side of the clip. The latter is provided on its outer side with a threaded stud 13, which engages one of the openings 6, with which brace-rod 2 is provided, thereby pivotally attaching the front end of the said brace-rod to the plow-beam. A nut 14 is screwed on the threaded stud 13 to thus secure the front brace-rod to the said clip.

A clip 15, which is identical in construction with the clip 11, is secured on one of the handles of the cultivator-plow, and to the said slip 15 is adjustably secured the rear brace-bar 16, which comprises the upper section 17 and the lower section 18. The upper section 17 has a series of adjusting-openings 19, whereby it may be adjustably secured on the stud 20 of clip 15, and the lower portion of said section 17 is bent outwardly to a substantially horizontal position to form a laterally-extending arm 21. The lower section 18 of the rear brace-bar is pivotally attached to the fender near the rear end of the latter, as at 22, and the upper portion of the said section 18 is bent inward laterally to form an adjusting-arm 23, which bears under the arm 21 of upper section 17 and is provided with an adjusting-slot 24. A clamping-bolt 25 in an opening in said arm 21 and in said adjusting-slot 24 secures the said sections 17 18 together at any desired lateral adjustment, the rear brace-bar 16 being hence laterally extensible as well as vertically adjustable on its attaching-clip. It will be understood from the foregoing that either the front or the rear end of the fender may be raised or lowered or adjusted laterally toward or from the beam, and hence the fender may be adjusted to any desired distance from the cultivating point or shovel or secured in any required relation thereto. The adjusting-screw 7, with which the front arm of the front brace-bar 2 is provided, bears against the plow-beam, and by turning the said screw the front end of the fender may be adjusted laterally toward or from the plow-beam.

It will be understood that my improved fender may be attached to the cultivating-plow almost instantaneously simply by securing the clips to the beam and one of the handles of the plow and that the fender may be as readily detached from the plow when the same is not required.

The fender is used when cultivating young and tender plants to prevent the same from being buried or injured by the earth thrown up by the cultivator.

Having thus described my invention, I claim—

The fender attachment for cultivating-plows, comprising the fender having the curved adjusting-slot near its front end, the front brace-bar pivotally attached to the front end of the fender, the adjusting-bolt connecting said brace-bar to said fender and operating in said curved adjusting-slot, the clip adapted to be secured to a plow-beam and to which said front brace-bar is pivoted and adjustably secured, the adjusting-bolt in said front brace-bar to bear against the plow-beam, for the purpose set forth, the rear brace-bar pivoted to the rear end of the fender and comprising the two sections which are secured together and laterally adjustable, whereby the rear end of the fender may be moved toward or from the plow, and the clip adapted to be secured to one of the plow-handles and to which the upper section of said rear brace-bar is adjustably secured, substantially as described.

In testimony that I claim the foregoing as my own I have hereto affixed my signature in the presence of two witnesses.

GEORGE WILEY HARRIS.

Witnesses:
J. L. ARD,
O. C. BEALL.